Patented Sept. 5, 1944

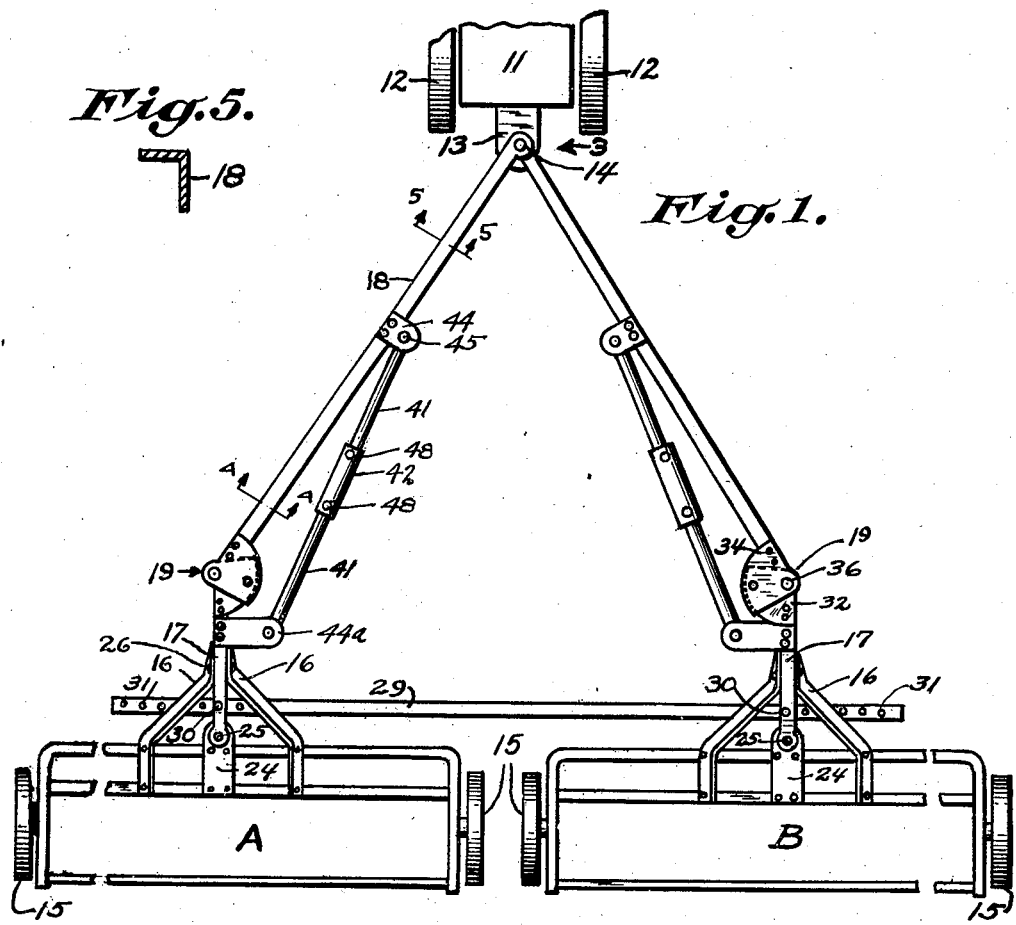
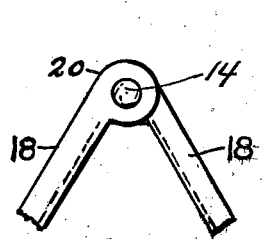
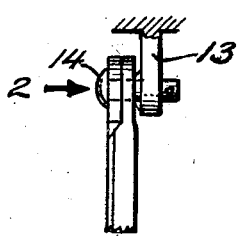

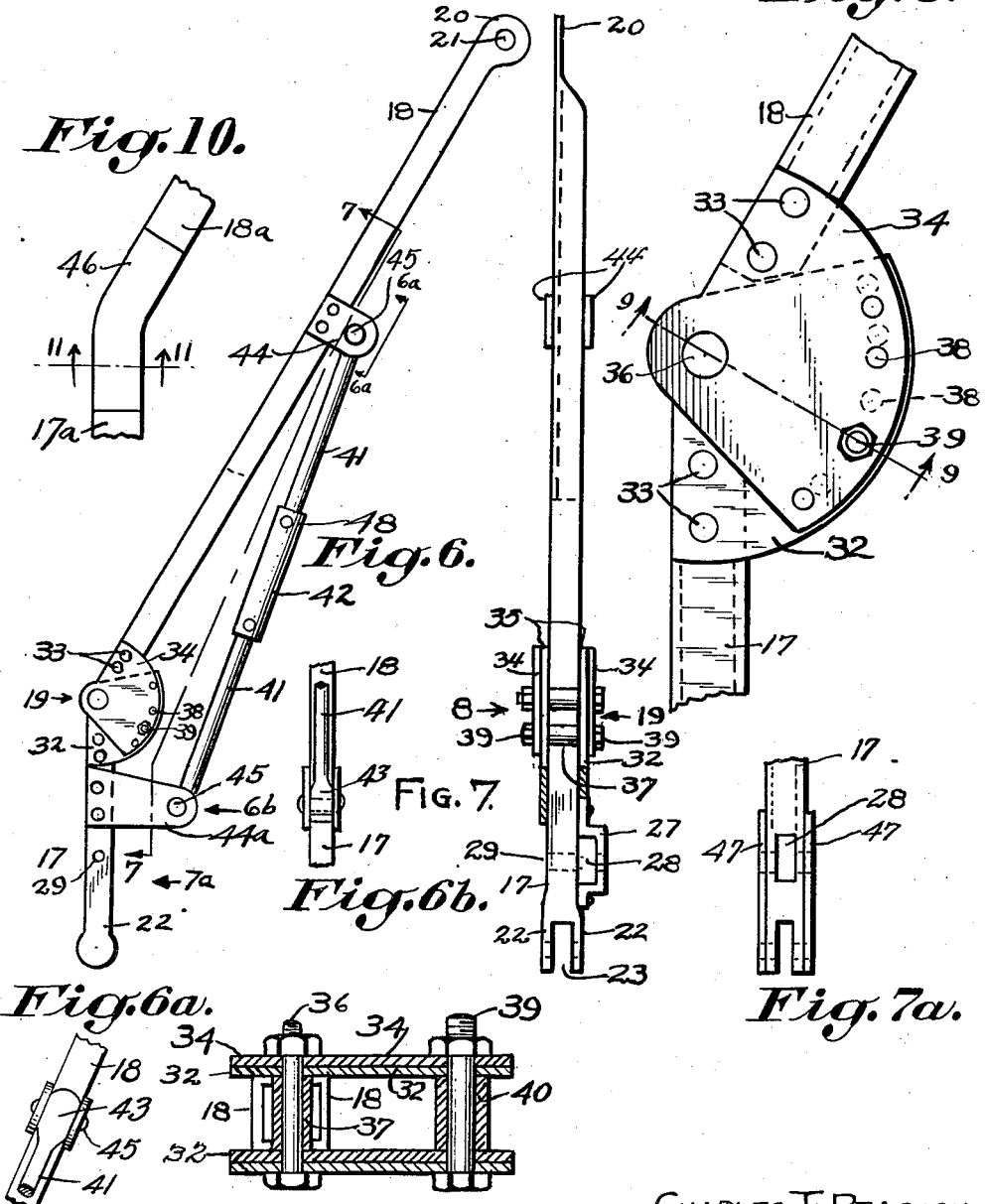

2,357,761

UNITED STATES PATENT OFFICE 2,357,761

TRACTOR HITCH

Charles T. Peacock, Lincoln County, Colo.

Application November 3, 1942, Serial No. 464,344

2 Claims. (Cl. 280—33.44)

This invention relates to improvements in tractor hitches of the type employed to draw a plurality of farm implements, such as listers, lister seeders and other implements in proper trailing relation to the tractor and to each other.

Another object of this invention is to produce a trailer hitch of such construction that it can be readily adjusted to adapt it to implements of different widths or sizes and to hold them in proper trailing relation.

Another object of this invention is to produce a tractor hitch of such construction that the two implements can move vertically, independently of each other, so as to accommodate themselves to uneven surfaces.

A further object of this invention is to produce a tractor hitch of such construction that the two implements can be secured in transverse alignment and which will hold them in a predetermined spaced relation during the turning of corners.

A further object of the invention is to produce a tractor hitch of a simple and substantial construction that can be manufactured and sold at a comparatively low price.

Another object of the invention is to produce a tractor hitch that shall not require any supporting wheels.

Another object of the invention is to produce a tractor hitch of such a design that it will resist compression stresses, as well as longitudinal tension and which will therefore be suitable for backing, as well as for moving forwardly.

The above and other objects that may become apparent as this description proceeds are attained by means of a construction and an arrangement of parts that will now be described in detail, and for this purpose reference will be had to the accompanying drawings in which the invention has been illustrated in its preferred form, and in which:

Figure 1 is a top plan view of the tractor hitch showing it in position between a tractor and two agricultural implements;

Figure 2 is a top plan view of the point of connection with the tractor, looking in the direction of arrow 2, Figure 3;

Figure 3 is a side view looking in the direction of arrow 3, Figure 1;

Figure 4 is a section taken on line 4—4, Figure 1;

Figure 5 is a section taken on line 5—5, Figure 1;

Figure 6 is a top plan view of one of the hitch elements;

Figure 6a is a fragmentary side elevation looking in the direction of arrows 6a, Figure 6;

Figure 6b is a fragmentary side elevation looking in the direction of arrow 6b, Figure 6;

Figure 7 is a side elevation, partly in section, taken on line 7—7, Figure 6;

Figure 7a is a fragmentary side elevation looking in the direction of arrow 7a, in Figure 6, and shows a slightly modified form of construction;

Figure 8 is a top plan view of the hinge looking in the direction of arrow 8, Figure 7;

Figure 9 is a section taken on line 9—9, Figure 8;

Figure 10 is a fragmentary top view showing a slightly modified form of construction; and Figure 11 is a section taken on line 11—11, Figure 10.

In the drawings reference numeral 11 represents an agricultural tractor having wheels 12 which may also represent the tracks of an endless track type of tractor. Secured to the rear end of the tractor is a hitch member 13 that has an opening for the reception of a king bolt 14, the two agricultural implements have been represented by letters A and B and are each supported on two wheels 15. These implements have been indicated in outline only for the reason that any ordinary agricultural implement may be employed, as, for example, seeders, listers, disks or any other implement. Such implements usually come provided with short tongues positioned between the brace members 16. In the present embodiment, the tongues have been replaced by a straight section 17 of the tractor hitch, which will now be described.

The tractor hitch consists of two tension members, like those shown in Figures 6 and 7, to which reference will now be had.

At this point it will be explained that the two tension members are identical with the exception that one is "right" and the other is "left" and they may be made identical, as will be hereinafter pointed out. For the reason just given only one of the tension members has been illustrated in detail and only one will therefore be described.

Each tension member consists of a short straight section 17 and a longer straight section 18, that are joined by means of a hinge which has been designated as an entirety by reference numeral 19 and which will be hereinafter described. The front end of member 18 is flattened, as indicated by reference numeral 20, and has an opening 21 for the reception of the king bolt 14. The lower end of the tension member, which is the lower end of member 17 in Figures 6 and 7, has been shown as forked, having two spaced members 22. The opening 23 between members 22 serves to receive the front end of a plate 24 that is secured to the corresponding implement. A pin or bolt 25 extends through openings in members 22 and 24. The braces 16 are secured to the straight section 17 by suitable bolts or rivets 26. It will now be seen that the straight section 17 of the hitch forms a tongue rigidly connected with the implement so that the latter is positively controlled in its position by this portion of the tractor hitch.

Referring now to Figure 7, it will be seen that a metal loop 27 has been secured to the under side of the straight member 17 so as to form a rectangular opening 28 through which the spacing bar 29 extends. Member 17 and loop 27 are provided with openings 29 for the reception of a pin 30 that also extends through opening 31 in member 29. It is evident that by changing the position of the pins 30 with respect to the openings in bar 29, the spacing between the implements can be increased or decreased so as to get the desired adjustment. The transverse adjustment becomes necessary whenever implements of different width are employed and in order to accommodate implements of material varying widths the tractor hitches have been made adjustable in a manner which will now be described.

From Figures 6, 7, 8 and 9, it will be seen that the hinge that adjustably connects members 17 and 18 comprises four arcuate plates, two of which are secured to the hitch members on top and two on the bottom. The lowermost plate has been designated by reference numeral 32 and are either welded to the member 17 or secured thereto by bolts or rivets 33, as indicated in the drawings. The upper plate of each pair has been designated by reference numeral 34 and is similarly secured to member 18 by means of rivets 33. Plate 34 is spaced from the upper surface of members 17 by a small plate having the thickness of plate 32. This plate has been designated by reference numeral 35 in Figure 7. The plates are provided with correspondingly positioned openings for the reception of a pivot pin 36, which may be a bolt or a rivet, that passes through the ferrule 37. It will now be apparent that the two sections 17 and 18 can be turned relative to each other about pin 36. Since the tractor hitch is required to be of a rigid construction, plates 32 and 34 are provided with a plurality of openings that have been designated by reference numeral 38. These openings are spaced the same radial distance from the center of the pivot, but are differently spaced in the two plates as indicated in Figure 8, so as to effect a variety of adjustments. A bolt 39 extends through the openings in both pair of plates and through the ferrule 40 (Figure 9). It is evident that after the bolt 39 has been put into position and the nut tightened in the manner shown in Figure 9, the two sections 17 and 18 will be rigidly interconnected, but the angular relation can be changed by removing the bolt 39 and positioning it in other openings.

For the purpose of making the tractor hitch more rigid so as to make it possible to employ smaller sections of structural steel, a brace comprising two rods 41 and an elongated nut 42 forming the three elements of a turnbuckle have been provided. The ends of rods 41 are provided with eyelets as indicated by reference numeral 43 and these are positioned between plates 44 and 44a and secured to the latter by means of rivets or pins 45. After the hinge has been adjusted to obtain the desired angular relation between the two sections of the hitch, the turnbuckle is operated so as to adjust its length in order to form a stress triangle that will serve as a strengthening device. One of the pins 45 may be a bolt that can be removed when the angular adjustment is effected and which can be replaced after the turnbuckle has been adjusted to its proper length.

It is apparent that by means of the construction shown, a very rigid tension member is obtained which will also resist powerful compression stresses.

In operation, the two straight members 17 should be parallel and whenever machines of materially different widths are substituted, the angular relation between parts 17 and 18 must be adjusted in the manner above explained.

Where no change in implements is contemplated, the hitch may be made without the adjustment above described and in Figure 10, a fragmentary top view of that portion where the hinge would be positioned has been shown. The two sections 17a and 18a are in this instance integral and have been reenforced by top and bottom plates 46. Such tractor hitches are obviously not suitable for use with machines of different widths unless such machines are pivotally connected with the ends of members 17 and such pivotal connection is to be avoided for the reason that if the machines were pivoted and positioned as shown in Figure 1, they would change their relative transverse positions when going around corners and when travelling in any but perfectly straight paths.

I am aware that in the prior art somewhat similar tractor hitches have been shown, but their construction is such that the implements must be positioned one in front of the other to permit the assembly to turn corners. As an example of such a tractor hitch, reference is made to United States Patent No. 1,636,802, issued July 26, 1927.

Since agricultural implements must be so constructed that they will operate on uneven surfaces, it is necessary that the implements A and B can move up and down independently of each other and in order to accomplish this, the openings 28 are made of considerable greater transverse areas than the bar 29 so as to permit a free movement of the parts. In similar manner, and for the same purpose, the openings through which the king bolt 14 passes are considerably larger than the bolt so as to permit free movement at this point. It is evident that the free independent movement may be obtained by specifically different constructions which, however, would merely serve the same function and operate in substantially the same way.

Due to the use of the loop 27, the two members of each tractor hitch are not absolute duplicates and must therefore be made and sold in pairs, one being a "right" and the other a "left." If the opening 28 were positioned in the center of member 17, as shown in Figure 7a, the two tractor hitch members would become identical and when such a construction is employed, the members 17 can be reenforced at this point by means of plates 47, which may be autogenously welded to the members 17. When constructed as shown in Figure 7a, there will be no material distinction between the "rights" and "lefts" with the result that two identical members can be employed which slightly simplifies the manufacture.

Attention is directed to the fact that the tractor hitch members are rigidly connected with the implements in the manner of an ordinary tongue and therefore in turning corners the two implements retain their position which is the same in turning as when the machine travels in a straight line.

Particular attention is called to the fact that the two members 17 and 18 can be angularly adjusted so as to adapt the two machines of different widths as it frequently happens that prospective purchasers are provided with different width implements and this tractor hitch can therefore be employed by practically any one, regardless of the width of the machine used.

In the present construction members 18 are formed in part from angle irons as shown in Figure 5 and the parts nearer to the hinge are preferably tubular and are usually formed by welding the edges of two identical angle irons to form a section like that shown in Figure 4.

Although a brace of the turnbuckle type has been shown and is believed to be especially well adapted for the purpose, it is to be understood that any other adjustable brace construction can be substituted. In order to prevent the elongated nut 42 from accidentally rotating it may be provided with set screws that serve to hold it from turning.

Having described the invention what is claimed as new is:

1. A tractor hitch bar comprising two sections of unequal length connected by a hinge, and means for locking the hinge in adjusted position, the free ends having means for effecting connections to a tractor and a ground implement, the shorter sections having additional means for effecting connection with a spreader bar, and a brace having one end connected with the longer and its other end connected with the shorter section.

2. A tongue for use in operatively attaching two agricultural implements in axially aligned spaced relation to a tractor, comprising two angularly related members of unequal length connected for angular adjustment by means of a hinge, means for clamping the hinge in adjusted position, and a brace having its ends connected each with one of the angularly related members to form with the latter the base of a triangular structure in which the hinge is at the vertex, and means for changing the relationship of the internal angles of the triangle.

CHARLES T. PEACOCK.